(12) United States Patent
Batu

(10) Patent No.: US 8,091,327 B2
(45) Date of Patent: Jan. 10, 2012

(54) RETRACTILE FINGER FOR FITTING TO GRAIN HARVESTER AUGER MAIN SHAFT

(75) Inventor: Neri Prestes Batu, Proto Alegre (BR)

(73) Assignee: AGCO do Brasil Comercio e Industria Ltda, Canoas (BR)

( * ) Notice: Subject to any disclaimer, the term of this patent is extended or adjusted under 35 U.S.C. 154(b) by 0 days.

(21) Appl. No.: 12/884,155

(22) Filed: Sep. 16, 2010

(65) Prior Publication Data

US 2011/0061354 A1 Mar. 17, 2011

(30) Foreign Application Priority Data

Sep. 17, 2009 (BR) ...................................... 0903650

(51) Int. Cl.
*A01D 46/08* (2006.01)

(52) U.S. Cl. ........................... 56/12.5; 198/722; 198/613

(58) Field of Classification Search .................. 56/12.5, 56/12.4, 364, 294, 14.5; 198/722, 613, 693, 198/518

See application file for complete search history.

(56) References Cited

U.S. PATENT DOCUMENTS

| | | | | | |
|---|---|---|---|---|---|
| 2,286,095 | A | * | 6/1942 | Innes | 56/364 |
| 2,529,180 | A | * | 11/1950 | Oehler | 198/513 |
| 2,633,231 | A | * | 3/1953 | Pilcher | 198/693 |
| 2,644,292 | A | * | 7/1953 | Oberholtz et al. | 56/364 |
| 2,696,290 | A | * | 12/1954 | Carroll | 198/720 |
| 2,701,634 | A | * | 2/1955 | Carroll | 198/518 |
| 2,778,483 | A | * | 1/1957 | Nikkel | 198/494 |
| 2,803,505 | A | * | 8/1957 | Oberholtz | 384/192 |
| 3,126,693 | A | * | 3/1964 | Renn | 56/364 |
| 3,613,346 | A | * | 10/1971 | Hubbard | 56/400 |
| 3,721,080 | A | * | 3/1973 | Marsh | 56/364 |
| 3,766,725 | A | * | 10/1973 | Marsh | 56/364 |
| 3,977,164 | A | * | 8/1976 | Ashton | 56/14.5 |
| 4,085,573 | A | * | 4/1978 | Marsh | 56/364 |
| 4,189,907 | A | * | 2/1980 | Erdman | 56/400 |
| 4,271,956 | A | * | 6/1981 | Hutchinson et al. | 198/613 |
| 4,290,259 | A | * | 9/1981 | Parvin et al. | 56/364 |
| 4,453,375 | A | * | 6/1984 | Field | 56/364 |
| 4,539,801 | A | * | 9/1985 | Field | 56/364 |
| 4,776,155 | A | * | 10/1988 | Fox et al. | 56/220 |
| D371,797 | S | * | 7/1996 | Bruns | D15/28 |
| D377,139 | S | * | 1/1997 | Bruns | D8/14 |
| 5,620,083 | A | * | 4/1997 | Vogelgesang | 198/722 |
| 5,768,868 | A | * | 6/1998 | Stein | 56/14.5 |
| 5,813,205 | A | * | 9/1998 | Gosa | 56/364 |
| 6,158,571 | A | * | 12/2000 | Gosa | 198/613 |
| 6,199,357 | B1 | * | 3/2001 | Bloom | 56/220 |
| 6,244,955 | B1 | * | 6/2001 | Bischoff et al. | 460/16 |
| 6,324,823 | B1 | * | 12/2001 | Remillard | 56/220 |
| 6,668,534 | B2 | * | 12/2003 | Sheedy et al. | 56/364 |
| 7,124,564 | B2 | * | 10/2006 | Glazik et al. | 56/220 |
| 7,392,646 | B2 | * | 7/2008 | Patterson | 56/364 |

(Continued)

FOREIGN PATENT DOCUMENTS

CA 2284432 A1 * 4/2001

*Primary Examiner* — Arpad Fabian-Kovacs

(57) ABSTRACT

The invention relates to a retractile finger (1) for fitting to a grain harvester auger (3) main shaft (2), which retractile finger comprises an elongated portion (4) having at one of its ends a portion in the form of a guide (5) for fitting to the above-mentioned shaft (2), the elongated portion (4) and the portion in the form of a guide (5) being formed in one piece made of polyethylene with a molar mass of between 3.9 and 10.5 million g/mol.

2 Claims, 3 Drawing Sheets

U.S. PATENT DOCUMENTS

| | | | |
|---|---|---|---|
| 7,401,457 B2 * | 7/2008 | Bich et al. | 56/294 |
| 7,426,819 B2 * | 9/2008 | Bich et al. | 56/364 |
| 2003/0110752 A1 * | 6/2003 | Dow | 56/364 |
| 2006/0252472 A1 * | 11/2006 | Lanzinger | 460/20 |
| 2007/0266692 A1 * | 11/2007 | Lolley | 56/364 |
| 2008/0256920 A1 * | 10/2008 | Yanke | 56/157 |
| 2009/0056295 A1 * | 3/2009 | Lolley | 56/220 |
| 2009/0056298 A1 * | 3/2009 | Lohrentz et al. | 56/364 |

* cited by examiner

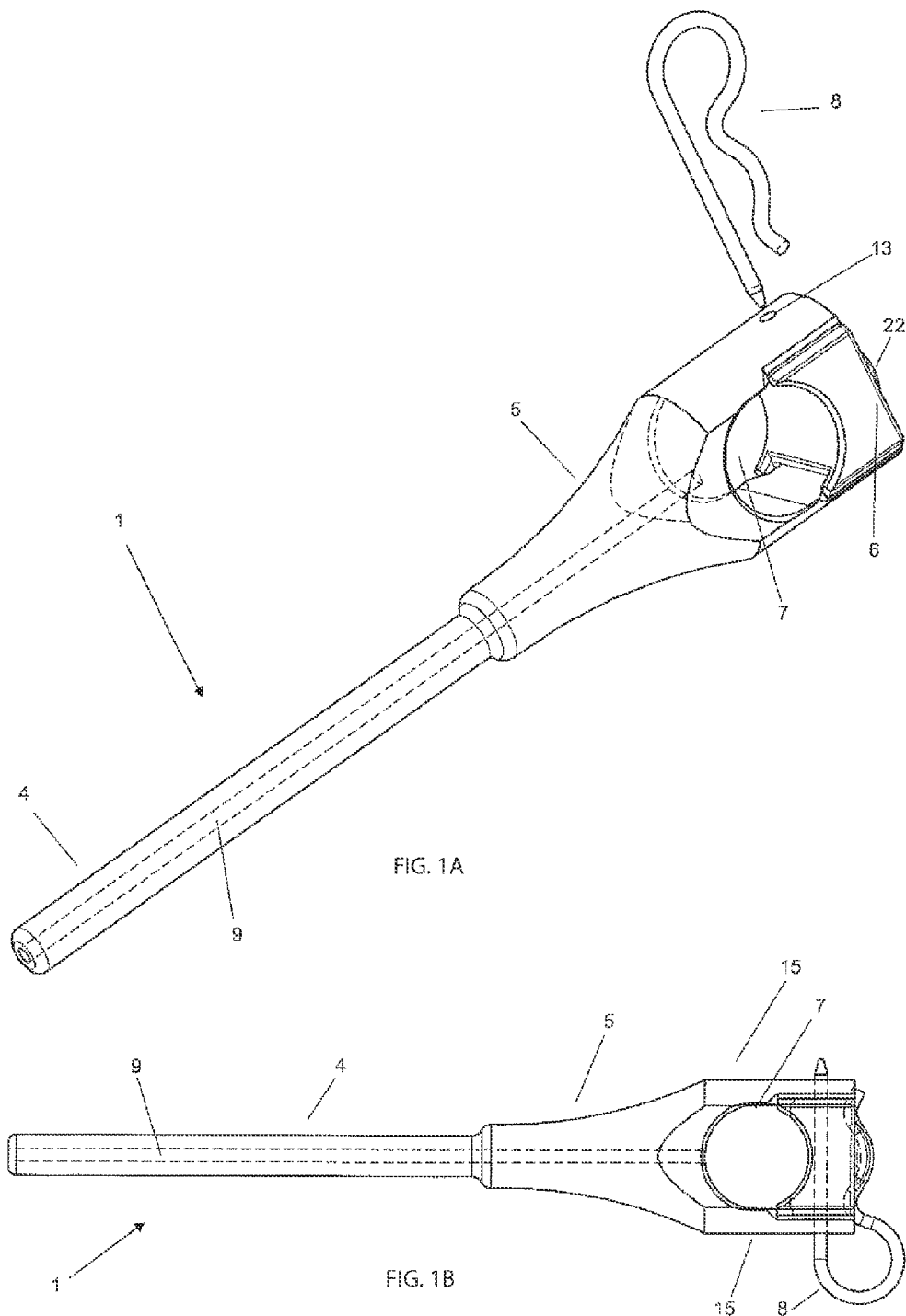

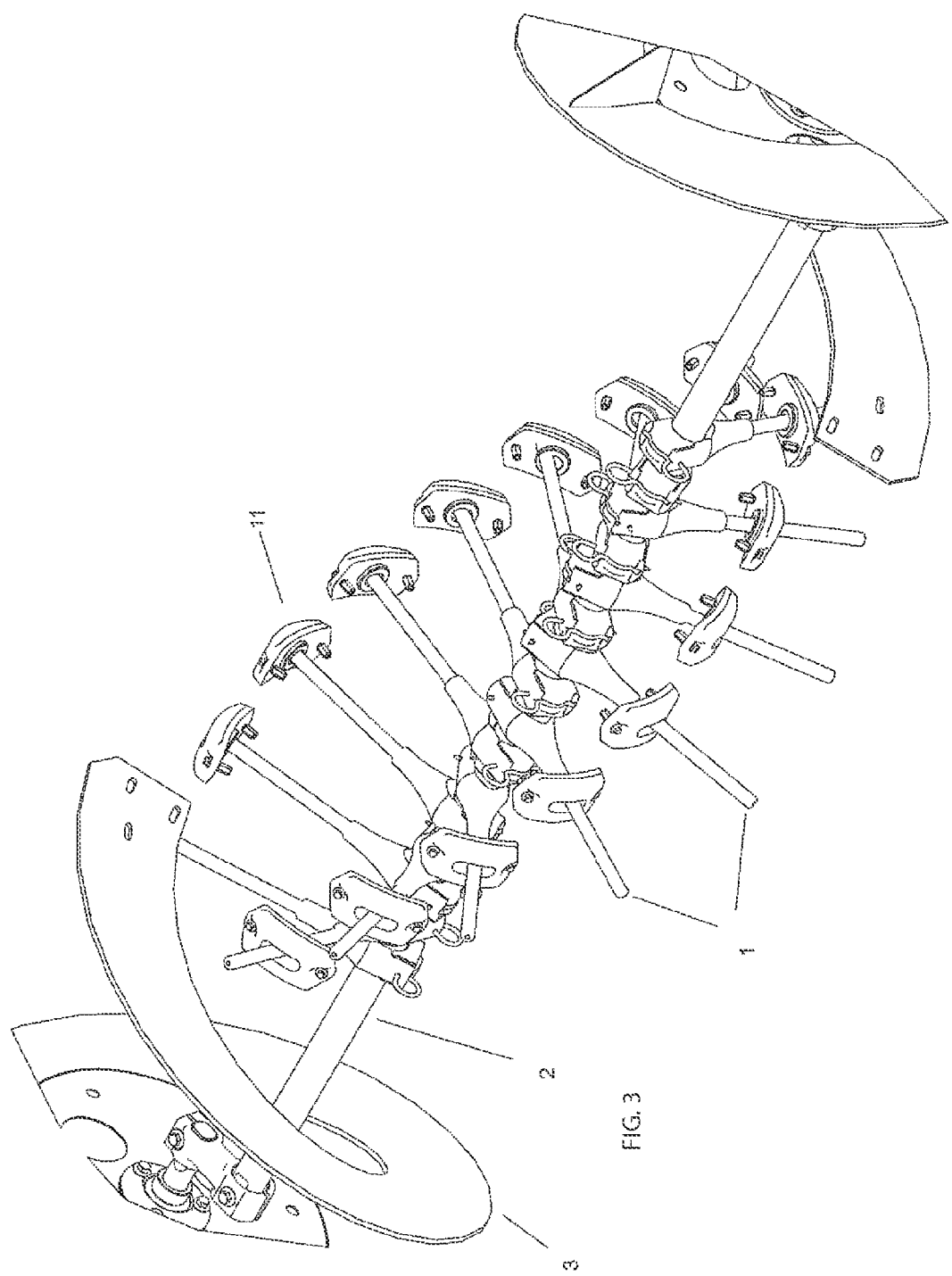

1

RETRACTILE FINGER FOR FITTING TO GRAIN HARVESTER AUGER MAIN SHAFT

This invention relates to a retractile finger for use in a rotatable auger assembly of a grain harvesting machine, more particularly for fitting to the main shaft of the machine's auger.

DESCRIPTION OF THE PRIOR ART

The front portion of grain harvesters usually has a platform provided with a rotatable auger with a main shaft, to which are fitted several retractile fingers which pull the straw and grain cut into the machine.

At present, various different types of retractile fingers are used in grain harvester auger installations. One example is retractile fingers made of solid steel with heat treatment and a cast steel bush to act as a guide in fitting to the auger main shaft. In this case, the finger is formed by an elongated part made of steel which is fitted to the bush by a screw thread system.

A second example is retractile fingers made of solid steel with heat treatment, with a fusible part or groove made in their elongated body, the finger also comprising a guide bush for the main shaft, the said guide bush being fitted, by means of a set of bolts, to the elongated portion of the finger. The function of the fusible part or groove is to give rise to the breakage of the elongated portion of the retractile finger, when this is subjected to greater torque than usual, due to contact with an object such as a stone or piece of wood which has entered the harvester platform table. This groove or fusible part requires a retaining system for the retractile finger so that, when the finger breaks, the above-mentioned system retains the broken part of the finger in the auger, preventing it from being pulled into the harvester, damaging it, or from being thrown forward, possibly hitting anyone who is in the vicinity, with the risk of serious injuries.

A third example is retractile fingers, each formed by a tube made of steel with heat treatment, having a guide bush fitted to one of its ends. The portion of tube is provided with a hole which acts as a fusible part.

OBJECTIVES OF THE INVENTION

One objective of the invention is to provide a retractile finger formed as a complete part, without the need for fitting between its elongated portion and bush for fitting to the auger's main shaft.

A second objective of this invention consists of providing a retractile finger which dispenses with the use of grooves or holes for acting as a fusible part.

A third objective of the invention consists of providing a retractile finger which dispenses with the use of steel for its manufacture, this process being simpler and more economical and the retractile finger being easy to maintain.

A fourth objective of this invention consists of providing a retractile finger which is of high impact resistance, breaking only in extreme situations of the machine's operation, without endangering the machine and people who are in its area of operation.

A fifth objective of this invention consists of providing a retractile finger which has high resistance to wear by abrasion and a very low coefficient of friction.

BRIEF DESCRIPTION OF THE INVENTION

The objectives of the invention are achieved by a retractile finger—for fitting to a grain harvester auger main shaft—comprising an elongated portion having at one of its ends a portion in the form of a guide for fitting to the above-mentioned shaft, the elongated portion and the portion in the form of a guide being formed in one piece made of polyethylene other plastics materials. Preferably the plastics material has a molar mass of between 3.9 and 10.5 million g/mol. Also, according to this invention, the polyethylene has, in the molten state, a melt flow index of 7.0 to 9.0 g/min at 190° C. and pressure of 21.6 kgf/cm².

In a preferred embodiment of the invention, the retractile finger comprises a closing part which can be fitted next to the portion in the form of a guide, the closing part and the portion in the form of a guide defining, when fitted, an internal cast region which clasps the auger's main shaft. Also according to a preferred embodiment, the finger comprises a cast hole which runs longitudinally inside the elongated portion and the portion in the form of a guide, providing this with greater flexibility and a reduction in weight.

SUMMARY DESCRIPTION OF THE DRAWINGS

This invention shall be described below in more detail, based on two examples shown in the drawings.

The illustrations show:

FIG. 1A is a perspective view of a first embodiment of the retractile finger of the invention;

FIG. 1B is a front view of the retractile finger in FIG. 1A;

Figure 2A:
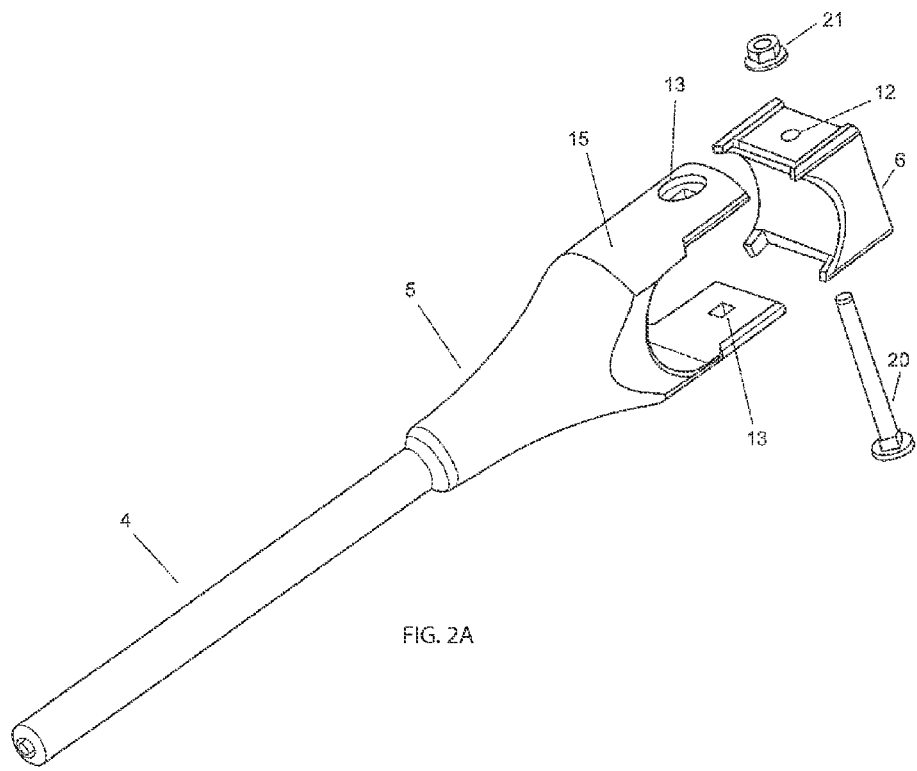
Figure 2B:
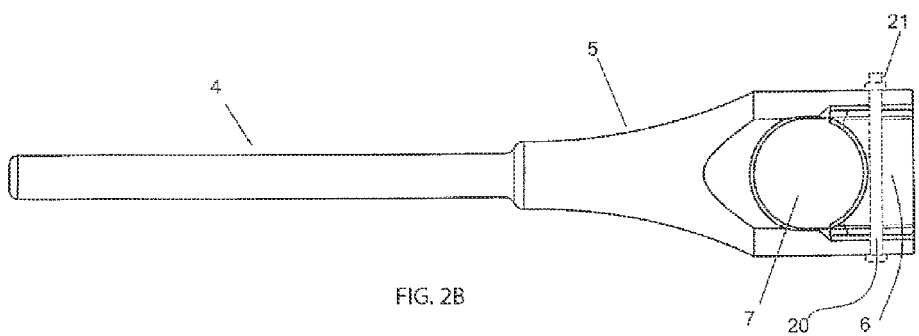

FIG. 2A—is an exploded perspective view of a second embodiment of the retractile finger of the invention;

FIG. 2B—is a front view of the retractile finger in FIG. 2, and

FIG. 3—is a perspective schematic view, in partial section, of a grain harvester auger.

DETAILED DESCRIPTION OF THE ILLUSTRATIONS

As can be seen from FIGS. 1A, 1B, 2A and 2B, the retractile finger 1 comprises an elongated portion 4 having at one of its ends a portion in the form of a guide 5 which ends in a U-shaped region. The elongated portion 4 and the portion in the form of a guide 5 form a complete part and are made from ultra-high molecular weight (UHMW) polyethylene.

The retractile finger 1 also comprises a closing part 6 (see FIG. 2A), also U-shaped, fitted next to the portion in the form of a guide 5. The closing part 6 is preferentially made of UHMW, possibly also being made of any other plastics material or even metal material.

The U shapes of the portion in the form of a guide 5 and of the closing part 6, when combined, form a cast hole 7 which runs transversely to the retractile finger 1.

The cast hole 7 is suitably formed to clasp the main shaft 2 of the snail 3 of a grain harvester (not shown). For illustrative purposes, FIG. 3 schematically shows a plurality of retractile fingers 1 fitted to the main shaft 2 of the snail 3 of a grain harvester. The illustration also shows the guide parts 11 of the retractile fingers 1, which guide parts are fitted in the closing cover (not shown) of the auger.

As illustrated in FIGS. 1A to 2B, the closing part 6 fits internally into the end tabs 15 of the portion in the form of a guide 5. The closing part 6 is provided with a cast hole 12 which, in the position when fitted into the portion in the form of a guide 5, aligns with a pair of holes 13 provided in the end tabs 15. As shown in FIGS. 1A and 1B, locking between the closing part 6 and the portion in the form of a guide 5 is effected by means of a fastening element or pin 8, which passes through the set of holes 12, 13 and locks the two parts 5 and 6 together, being supported on a projection 22 of the closing part 6.

FIGS. 2A and 2B show another fastening element for the parts 5, 6, formed as a set of a bolt 20 and nut 21. In this formation, the closing part 6 can be produced without the projection 22. It is important to note that the fastening element can be any, such as, for example, a bolt without a nut. In the latter case, the region of the hole 13 of one of the end tabs 15 must be provided with a screw thread.

The primary material (UHMW) used for manufacturing the retractile finger 1 brings several advantages. It is an ultra-high molecular weight polyethylene, the molecular weight being between 3.9 and 10.5 million g/mol. The extremely high molecular weight gives this engineering plastics not only excellent mechanical properties but also extremely high viscosity in the molten state, with a melt flow index close to zero.

The retractile finger 1 made of UHMW plastics also brings as an advantage the fact that the finger 1 dispenses with the making of a groove or fusible part in its body for the breakage of the finger 1 in the event of its being subjected to above-normal torque when, for example, coming into contact with a stone or some wood which has entered the table of the platform (not shown) of the harvester. To this end, the structure proposed by the invention, with the retractile finger 1 made of UHMW, causes the finger 1 to have suitable flexibility to bend and to prevent the pulling of large masses or undesirable objects into the harvester. As shown in FIGS. 1A and 1B, the elongated portion 4 and the portion in the form of a guide 5 have a cast hole 9 which runs longitudinally inside them, something which reduces the weight of the retractile finger 1 and increases its flexibility. In the event that the finger 1 breaks, which will happen only in extreme situations, it will be retained in the machine's auger assembly or, if it ends up outside the snail assembly, it will not present risks to people or even to the machine.

The retractile finger of this invention has a series of advantages, including:
- high resistance to wear by abrasion, high impact resistance and a very low coefficient of friction,
- high energy absorption capacity and high shearing strength,
- excellent chemical resistance,
- reduction of noise in the machine's operation and
- many application possibilities due to dimensional stability at temperatures between −200° C. and +90° C.

One example of a preferred embodiment having been described, it must be understood that the object of this invention includes other possible variations, being limited only by the content of the attached claims, including the possible equivalents.

The invention claimed is:

1. A retractile finger (1) fitted to a grain harvester auger (3) main shaft (2), the finger having an elongated portion (4) having at one of its ends a portion in the form of a guide (5) for fitting to the shaft (2), the elongated portion (4) and the portion in the form of the guide (5) being formed in one piece made of polyethylene or other plastics material, and a closing part (6) which is fitted next to the portion in the form of a guide, the closing part and the portion in the form of a guide defining, when fitted, an internal cast region (7) which runs transverse to the elongated portion and clasps the auger main shaft, the finger having a cast hole (9) which runs longitudinally in the elongated portion and in the portion in the form of the guide.

2. The retractile finger according to claim 1, in which the elongated portion and the portion in the form of a guide being formed in one piece made of ultra-high molecular weight polyethylene having a molar mass of between 3.9 and 10.5 million g/mol, and in the molten state, a melt flow index of 7.0 to 9.0 g/min at 190° C. and pressure of 21.6 kgf/cm$^2$.

* * * * *